(12) United States Patent
Ishibashi et al.

(10) Patent No.: US 8,034,472 B2
(45) Date of Patent: Oct. 11, 2011

(54) MAGNETIC RECORDING MEDIUM, METHOD OF MANUFACTURING THE SAME, AND MAGNETIC RECORDING/REPRODUCING APPARATUS

(75) Inventors: Shinichi Ishibashi, Ichihara (JP); Migaku Takahashi, Sendai (JP); Shin Saito, Sendai (JP); Yuzo Sasaki, Ichihara (JP); Atsushi Hashimoto, Chiba (JP); Gohei Kurokawa, Ichihara (JP); Tomoyuki Maeda, Kawasaki (JP); Akihiko Takeo, Tokyo (JP)

(73) Assignees: Showa Denko K.K., Tokyo (JP); Kabushiki Kaisha Toshiba, Tokyo (JP); Tohoku University, Miyagi-Ken (JP)

( * ) Notice: Subject to any disclaimer, the term of this patent is extended or adjusted under 35 U.S.C. 154(b) by 42 days.

(21) Appl. No.: 12/542,372

(22) Filed: Aug. 17, 2009

(65) Prior Publication Data

US 2010/0039730 A1 Feb. 18, 2010

(30) Foreign Application Priority Data

Aug. 18, 2008 (JP) ................................. 2008-209907

(51) Int. Cl.
*G11B 5/66* (2006.01)
(52) U.S. Cl. .................................................. 428/831.2
(58) Field of Classification Search .................. None
See application file for complete search history.

(56) References Cited

U.S. PATENT DOCUMENTS

| | | |
|---|---|---|
| 6,638,648 B2 | 10/2003 | Yamamoto et al. |
| 6,858,310 B2 | 2/2005 | McGee et al. |
| 7,083,870 B2 | 8/2006 | Shimizu et al. |
| 7,368,185 B2 | 5/2008 | Hirayama et al. |
| 7,695,832 B2 | 4/2010 | Oikawa |
| 2010/0033873 A1 | 2/2010 | Ishibashi et al. |

FOREIGN PATENT DOCUMENTS

| | | |
|---|---|---|
| JP | 2001-006158 A | 1/2001 |
| JP | 2002-109720 A | 4/2002 |
| JP | 2004-046990 A | 2/2004 |
| JP | 2005-190517 A | 7/2005 |

*Primary Examiner* — Holly Rickman
(74) *Attorney, Agent, or Firm* — Sughrue Mion, PLLC

(57) ABSTRACT

The present invention provides a magnetic recording medium which is capable of improving the perpendicular orientation of a perpendicular magnetic recording layer while maintaining a writing performance during recording and obtaining both an improvement in the perpendicular orientation and fine magnetic crystal particles with a uniform diameter, and which enables information to be recorded or reproduced at high density, a method of manufacturing the same, and a magnetic recording/reproducing apparatus. A magnetic recording medium 10 according to the present invention includes at least a soft magnetic underlayer 2, an orientation control layer 3, a magnetic recording layer 4, and a protective layer 5 formed on a non-magnetic substrate 1. The orientation control layer 3 has a seed layer 6 and an intermediate layer 7. The seed layer 6 is made of a Cu—Ti alloy that has a face-centered cubic structure and includes Cu as a main component. The Cu—Ti alloy has a (111) crystal plane oriented substantially perpendicular to the surface of the non-magnetic substrate 1 and has a pseudo-hexagonal structure.

6 Claims, 4 Drawing Sheets

MAGNETIC RECORDING MEDIUM, METHOD OF MANUFACTURING THE SAME, AND MAGNETIC RECORDING/REPRODUCING APPARATUS

BACKGROUND OF THE INVENTION

1. Field of the Invention

The present invention relates to a magnetic recording medium, a method of manufacturing the same, and a magnetic recording/reproducing apparatus using the magnetic recording medium.

Priority is claimed on Japanese Patent Application No. 2008-209907, filed Aug. 18, 2008, the content of which is incorporated herein by reference.

2. Description of Related Art

In recent years, the application range of magnetic recording apparatuses, such as magnetic disk apparatuses, flexible disk apparatuses, and magnetic tape apparatuses, has increased remarkably, and their importance thereof has increased. Therefore, a technique has been developed for significantly improving the recording density of magnetic recording media used for these apparatuses. In particular, the development of an MR (magneto resistive) head and a PRML (partial response maximum likelihood) technique has accelerated the improvement in the areal recording density of magnetic recording media. In recent years, with the development of GMR (giant magneto resistive) heads and TuMR (tunneling magneto resistive) heads, the areal recording density of the magnetic recording media has increased significantly.

As such, there is a demand for a further increase in the recording density of magnetic recording media. In order to meet the demand, it is necessary to improve the coercivity, the signal-to-noise ratio (S/N ratio), and the resolution of a magnetic recording layer. In a longitudinal magnetic recording type that has generally been used, with the increase in linear recording density, recording magnetic domains adjacent to a magnetization transition region mutually weaken their magnetizations, which is called self-demagnetization. In order to prevent the self-demagnetization, it is necessary to reduce the thickness of the magnetic recording layer to increase shape magnetic anisotropy.

When the thickness of the magnetic recording layer is reduced, the strength of the energy barrier for maintaining the magnetic domain is substantially equal to that of thermal energy, and the phenomenon in which the amount of recorded magnetization is reduced due to temperature variation (thermal fluctuation phenomenon) is not negligible. The thermal fluctuation phenomenon or the self-demagnetization determines the limit of the linear recording density.

In recent years, a technique has been examined for solving the problem of the reduction in thermomagnetic and improving the linear recording density of the longitudinal magnetic recording type. For example, a medium having an AFC (anti-ferromagnetic coupling) structure has been proposed in order to maintain the magnetization state of the magnetic domain at a high level.

As a technique for further improving areal recording density, a perpendicular magnetic recording technique has attracted attention. In the longitudinal magnetic recording type according to the related art, a medium is magnetized in the in-plane direction. However, in the perpendicular magnetic recording type, a medium is magnetized in a substantially perpendicular direction to the surface of the medium. In this way, in the perpendicular magnetic recording type, it is possible to avoid the self-demagnetization that prevents an increase in linear recording density in the longitudinal magnetic recording type. Therefore, it is considered that the perpendicular magnetic recording type is suitable for high-density recording. In addition, since the perpendicular magnetic recording type can maintain the thickness of the magnetic layer to be constant, it is possible to relatively reduce the effect of thermomagnetic relaxation caused in longitudinal magnetic recording.

In general, a perpendicular magnetic recording medium is obtained by sequentially forming an orientation control layer, a magnetic recording layer, and a protective layer on a non-magnetic substrate. In many cases, a lubrication layer is formed on the surface of the protective layer. In addition, in many cases, a soft magnetic underlayer, which is an underlayer, is provided below the orientation control layer. The orientation control layer generally includes a seed layer and an intermediate layer formed on the substrate in this order. The intermediate layer is formed in order to further improve the characteristics of the magnetic recording layer. In addition, the seed layer functions to align the crystal particles of the intermediate layer and the magnetic recording layer, and control the shape of a magnetic crystal.

The crystal structure of the magnetic recording layer is important to manufacture a perpendicular magnetic recording medium with good characteristics. That is, in the perpendicular magnetic recording medium, generally, the crystal structure of the magnetic recording layer is a hexagonal close-packed (hcp) structure. It is important that a (002) crystal plane is parallel to the surface of the substrate, that is, a crystal c-axis ([002] axis) is aligned substantially perpendicular to the surface of the substrate with the least possible disorder. However, the perpendicular magnetic recording medium has an advantage in that it can use a relatively thick magnetic recording layer, but it has disadvantages in that the total thickness of the layers of the medium is likely to be larger than in the longitudinal magnetic recording medium and the crystal structure is likely to be disordered during a process of forming thin films of a medium.

In order to align the crystal particles of the magnetic recording layer with the least possible disorder, the intermediate layer of the perpendicular magnetic recording medium has been made of Ru having the same hexagonal close-packed (hcp) structure as the magnetic recording layer. Since the crystal of the magnetic recording layer is epitaxially grown on the (002) crystal plane of Ru, a magnetic recording medium with good crystal orientation is obtained (for example, see Patent Document 1).

The seed layer disposed below the intermediate layer needs to have characteristics that improve the crystal orientation of the intermediate layer. Therefore, in the related art, the seed layer having a face-centered cubic (fcc) structure has been used (for example, see Patent Document 2). In this case, the (002) crystal plane having the hexagonal close-packed (hcp) structure is preferentially oriented on a (111) crystal plane having the face-centered cubic (fcc) structure. Therefore, it is possible to reduce the total thickness for obtaining the same orientation, as compared to when Ru is directly formed on the underlayer.

In Patent Document 3, a first intermediate layer (seed layer) formed immediately on the underlayer is made of Ti having the hexagonal close-packed (hcp) structure, a second intermediate layer is made of Cu-5at % Ti having the fcc structure, and a third intermediate layer is made of Ru.

However, it is necessary to increase the thickness of the seed layer having the hexagonal close-packed (hcp) structure to a certain value (10 nm or more), in order to improve the crystal orientation. However, when the seed layer is made of a non-magnetic material and the thickness of the seed layer is increased, the distance between the magnetic recording layer and the soft magnetic underlayer is increased. As a result, during recording, the magnetic field applied from the head is weakened, and the writing performance is reduced.

In contrast, an element having the face-centered cubic (fcc) structure shows a certain degree of crystal orientation with a thickness of about 5 nm. When the crystal orientation is improved, the crystal particle diameter thereof is also increased. Since one crystal of the intermediate layer and one crystal of the magnetic recording layer are grown on one crystal of the seed layer, an increase in the crystal particle diameter of the seed layer means an increase in the crystal particle diameter of the magnetic recording layer. In order to further improve areal recording density, it is crucial to improve the crystal c-axis orientation of the magnetic recording layer, make the particle diameters uniform, and reduce the size of the particles. When the seed layer having the face-centered cubic (fcc) structure is used, it is difficult to improve the crystal orientation and obtain fine particles with a uniform diameter.

As described above, the seed layer made of a crystal material having the face-centered cubic (fcc) structure or the hexagonal close-packed (hcp) structure is insufficient to obtain a perpendicular magnetic recording medium having good read/write characteristics. Therefore, a perpendicular magnetic recording medium is required which is capable of maintaining the writing performance during recording by reducing the thickness between the underlayer and the magnetic recording layer, improving the crystal orientation of the magnetic recording layer, obtaining fine crystal particles with a uniform diameter, and being manufactured by a simple process.

Patent Document 4 discloses a structure in which an orientation control film is made of a material having a C11b structure and the orientation control film is made of a material including at least one or two or more of Al, Ag, Au, Cu, Ge, Hf, Ni, Si, Ti, Zn, and Zr.

[Patent Document 1] JP-A-2001-6158
[Patent Document 2] JP-A-2002-109720
[Patent Document 3] JP-A-2005-190517
[Patent Document 4] JP-A-2004-46990

The present invention has been made in order to solve the above problems, and an object of the present invention is to provide a magnetic recording medium which is capable of improving the perpendicular orientation of a perpendicular magnetic recording layer while maintaining the writing performance during recording and obtaining both an improvement in perpendicular orientation and fine magnetic crystal particles with a uniform diameter, and which enables information to be recorded or reproduced at high density, a method of manufacturing the same, and a magnetic recording/reproducing apparatus.

SUMMARY OF THE INVENTION

In order to achieve the object, the present invention has the following structure.

According to a first aspect of the present invention, a magnetic recording medium includes at least an underlayer, an orientation control layer, a magnetic recording layer, and a protective layer formed on a non-magnetic substrate. The orientation control layer has a multi-layer structure including at least a seed layer and an intermediate layer. The seed layer is arranged closer to the non-magnetic substrate than the intermediate layer. The seed layer includes an alloy layer that is made of a Cu—Ti alloy, which is a main material, having Cu as a main component. The Cu—Ti alloy has a (111) crystal plane oriented substantially perpendicular to the surface of the non-magnetic substrate and has a pseudo-hexagonal structure.

According to a second aspect of the present invention, in the magnetic recording medium according to the first aspect, in the Cu—Ti alloy, the content of Cu may be in the range of 85 at % to 95 at %, and the content of Ti may be in the range of 5 at % to 15 at %.

According to a third aspect of the present invention, in the magnetic recording medium according to the first or second aspect, the thickness of the seed layer may be equal to or greater than 3 nm and equal to or less than 10 nm.

According to a fourth aspect of the present invention, in the magnetic recording medium according to any one of the first to third aspects, the underlayer may be made of a soft magnetic material, which is a main material, having an amorphous structure.

According to a fifth aspect of the present invention, in the magnetic recording medium according to any one of the first to fourth aspects, the intermediate layer may include a metal layer that is made of Ru, Re, or any one of alloy materials thereof, which is a main material, and has a hexagonal close-packed structure.

According to a sixth aspect of the present invention, in the magnetic recording medium according to any one of the first to fourth aspects, the intermediate layer may have at least one element selected from elements having a face-centered cubic structure as a main component, an alloy containing an element having a body-centered cubic structure, a face-centered cubic structure performing (111) crystal plane orientation approximately perpendicularly to the surface of the non-magnetic substrate, and an irregular layer lattice being in layers and a body-centered cubic structure therein.

According to a seventh aspect of the present invention, in the magnetic recording medium according to any one of the first to fourth aspects, the intermediate layer may have at least one element selected from elements having a face-centered cubic structure as a main component, an alloy containing an element having a hexagonal close-packed structure, a face-centered cubic structure performing (111) crystal plane orientation approximately perpendicularly to the surface of the non-magnetic substrate, and an irregular layer lattice being in layers and a hexagonal close-packed structure therein.

According to an eighth aspect of the present invention, in the magnetic recording medium according to any one of the first to seventh aspects, the magnetic recording layer may include a magnetic layer that has a granular structure formed by ferromagnetic crystal particles and a grain boundary made of a non-magnetic oxide, and the average diameter of the ferromagnetic crystal particles in the magnetic layer may be equal to or less than 7.5 nm in particle diameter analysis using a transmission electron microscope.

According to a ninth aspect of the present invention, there is provided a method of manufacturing a magnetic recording medium including at least an underlayer, a seed layer, an intermediate layer, a magnetic recording layer, and a protective layer formed on a non-magnetic substrate. The method includes a step of forming the seed layer made of a Cu—Ti alloy, having Cu as a main component, such that the Cu—Ti alloy has a pseudo-hexagonal structure in which a (111) crystal plane is oriented substantially perpendicular to the surface of the non-magnetic substrate.

According to a tenth aspect of the present invention, in the method of manufacturing a magnetic recording medium according to the ninth aspect, a step of forming the intermediate layer may include: a first step of forming a first intermediate layer at a gas pressure of 1 Pa or less in a film forming atmosphere using a vapor deposition technique; and a second step of forming a second intermediate layer on the first intermediate layer at a gas pressure of 1.5 Pa or more in the film forming atmosphere using the vapor deposition technique.

According to an eleventh aspect of the present invention, a magnetic recording/reproducing apparatus includes: the magnetic recording medium according to any one of the first to eighth aspects; and a magnetic head that records or reproduces information on or from the magnetic recording medium.

EFFECTS OF THE INVENTION

According to the present invention, since the seed layer has a predetermined crystal structure, the seed layer has fine crystal particles with a uniform diameter and a high degree of crystal orientation in a relatively small thickness range. Therefore, the intermediate layer and the magnetic recording layer provided on the seed layer also include fine crystal particles with a uniform diameter and a high degree of crystal orientation, according to the diameter and orientation of the crystal particles in the seed layer. For example, in the magnetic recording layer having the hexagonal close-packed (hcp) structure, a crystal c-axis is aligned with the surface of the non-magnetic substrate with a small angular variance.

Since the magnetic recording layer includes fine crystal particles with a uniform diameter, the recording bit transition boundary line becomes a smooth straight line, and good characteristics can be obtained in a high recording density region.

Since the seed layer has a high degree of crystal orientation in a relatively small thickness range, it is possible to ensure sufficient crystal orientation and reduce the thickness thereof. In this way, it is possible to reduce the distance between the soft magnetic underlayer and the magnetic recording layer. In addition, when the recording head applies a recording magnetic field, it is possible to reduce the distance between the recording head and the soft magnetic underlayer. As a result, the magnetic field from the recording head is effectively applied to the magnetic recording layer, and it is possible to obtain a high level of writing performance.

DETAILED DESCRIPTION OF THE INVENTION

Hereinafter, the content of the present invention will be described in detail. First, a magnetic recording medium according to the present invention will be described.

Figure 1:
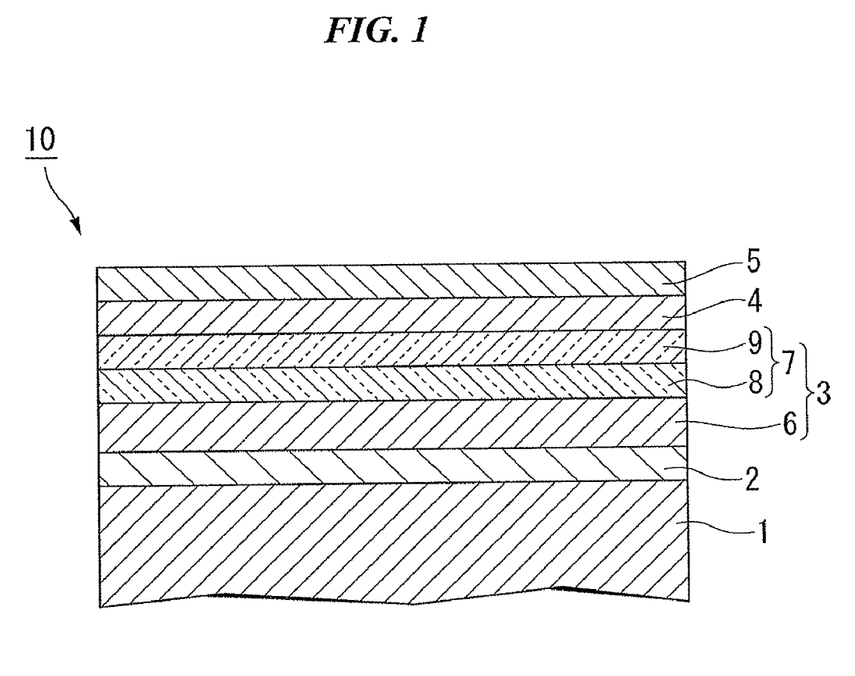
FIG. 1 is a longitudinal cross-sectional view illustrating a magnetic recording medium according to an embodiment of the present invention.

FIG. 1 is a longitudinal cross-sectional view illustrating a magnetic recording medium according to an embodiment of the present invention.

A perpendicular magnetic recording medium 10 shown in FIG. 1 includes at least a soft magnetic underlayer 2, an orientation control layer 3 that controls the orientation of a film formed thereon, a magnetic recording layer 4 having an magnetic easy axis or easy axis of magnetization (crystal c-axis) that is substantially perpendicular to a substrate, and a protective layer 5, which are formed on a non-magnetic substrate 1 in this order from a side of a non-magnetic substrate 1. The orientation control layer 3 includes a plurality of layers (two layers in this embodiment). Of the layers in the orientation control layer 3, a layer facing the substrate is referred to as a seed layer 6 and the other layer is referred to as an intermediate layer 7.

As the non-magnetic substrate 1, any of the following non-magnetic substrates may be used: an Al alloy substrate made of, for example, an Al—Mg alloy having Al as a main component; a general soda glass substrate; an aluminosilicate-based glass substrate; an amorphous glass-based substrate; a silicon substrate; a titanium substrate; a ceramics substrate; a sapphire substrate; a quartz substrate; and substrates made of various kinds of resins. Among the substrates, in many cases, an Al alloy substrate or a glass-based substrate, such as a glass ceramics substrate or an amorphous glass substrate, may be used as the non-magnetic substrate. In the case of the glass substrate, it is preferable to use a mirror-polished substrate or a substrate having a low surface roughness Ra (Ra<1(Å)). The non-magnetic substrate 1 may include a little texture.

Next, the layers formed on the non-magnetic substrate 1 will be described.

The soft magnetic underlayer 2 is generally provided in a general perpendicular magnetic recording medium. In order to record signals on the magnetic recording medium 10, a recording magnetic field is generated from a head, and a perpendicular component of the recording magnetic field is effectively applied to the magnetic recording layer 4.

The soft magnetic underlayer 2 may be made of a material having so-called soft magnetic characteristics, such as a FeCo-based alloy, a CoZrNb-based alloy, or a CoTaZr-based alloy. It is preferable that the soft magnetic underlayer 2 have an amorphous structure. When the soft magnetic underlayer 2 has the amorphous structure, it is possible to reduce the surface roughness Ra of the magnetic recording medium 10. As a result, it is possible to reduce the floating height of the head and improve recording density. The structure of the soft magnetic underlayer 2 is not limited to a single soft magnetic layer structure, but the soft magnetic layer 2 may have an AFC (anti-ferromagnetic coupling) structure in which a very thin non-magnetic film made of, for example, Ru is interposed between two soft magnetic layers.

The overall thickness of the soft magnetic underlayer 2 is in the range of about 10 nm to 50 nm, but it is appropriately determined by the balance between read/write characteristics and OW (over-write) characteristics.

The orientation control layer 3 that controls the orientation of a film formed thereon is provided on the soft magnetic underlayer 2.

The orientation control layer 3 has the seed layer 6 and the intermediate layer 7 formed on the non-magnetic substrate 1 in this order.

The seed layer 6 has a function of arranging the crystal orientation of the intermediate layer 7 and the magnetic recording layer 4 and a function of controlling the shapes of the magnetic crystal particles of the magnetic recording layer 4.

In the present invention, particularly, the seed layer 6 is made of a Cu—Ti alloy having Cu as the main component, and the Cu—Ti alloy has a (111) crystal plane orientation in a substantially perpendicular direction to the surface of the non-magnetic substrate 1 and has a pseudo-hexagonal structure.

The seed layer 6 having the above-mentioned structure includes fine crystal particles with a uniform diameter and a high degree of crystal orientation in a relatively small thickness range. Therefore, the intermediate layer 7 and the magnetic recording layer 4 provided on the seed layer 6 also include fine crystal particles with a uniform diameter and a high degree of crystal orientation, according to the diameter and orientation of the crystal particles in the seed layer 6. For example, in the magnetic recording layer 4 having a hexagonal close-packed (hcp) structure, a crystal c-axis is aligned with the surface of the non-magnetic substrate 1 with a small angular variance.

Since the magnetic recording layer 4 includes fine crystal particles with a uniform diameter, a recording bit transition boundary line becomes a smooth straight line, and good characteristics can be obtained in a high recording density region.

Since the seed layer 6 has a high degree of crystal orientation in a relatively small thickness range, it is possible to ensure sufficient crystal orientation and reduce the thickness thereof. In this way, it is possible to reduce the distance between the soft magnetic underlayer 2 and the magnetic recording layer 4. In addition, when the recording head applies a recording magnetic field, it is possible to reduce the distance between the recording head and the soft magnetic underlayer 2. As a result, the magnetic field from the recording head is effectively applied to the magnetic recording layer 4, and it is possible to obtain a high level of writing performance.

For example, the crystal structure of the Cu—Ti alloy can be controlled by changing the composition of the Cu—Ti alloy. In the present invention, particularly, it is preferable that the content of Ti be in the range of 5 to 15 at %. In this case, it is possible to easily obtain a Cu—Ti alloy having the above-mentioned crystal structure, that is, a (111) crystal plane orientation in a substantially perpendicular direction to the surface of the non-magnetic substrate 1 and a pseudo-hexagonal structure. The reason will be described below.

Figure 2:
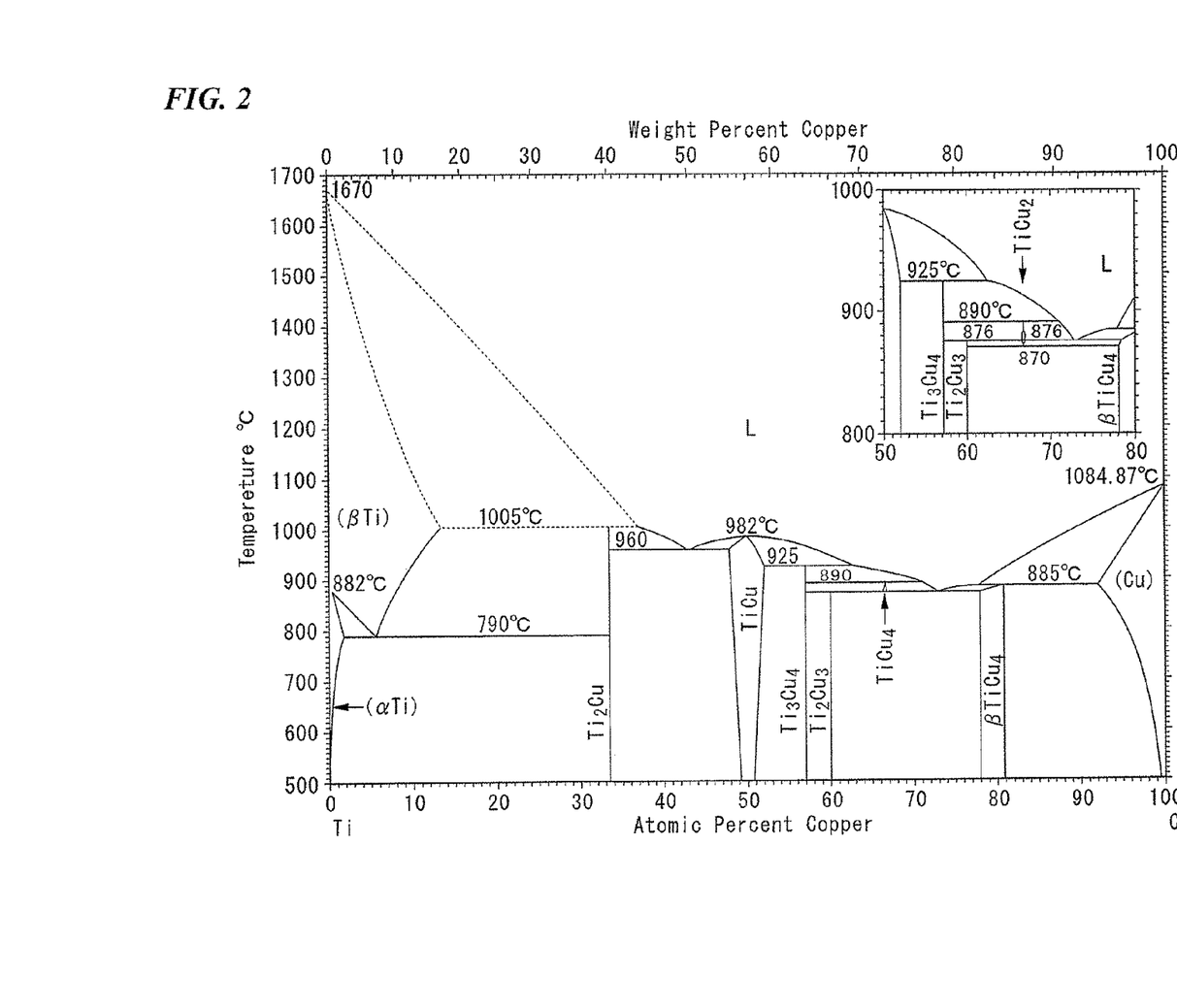
FIG. 2 is an alloy phase diagram illustrating a Cu—Ti alloy in a bulk state.
Figure 3:
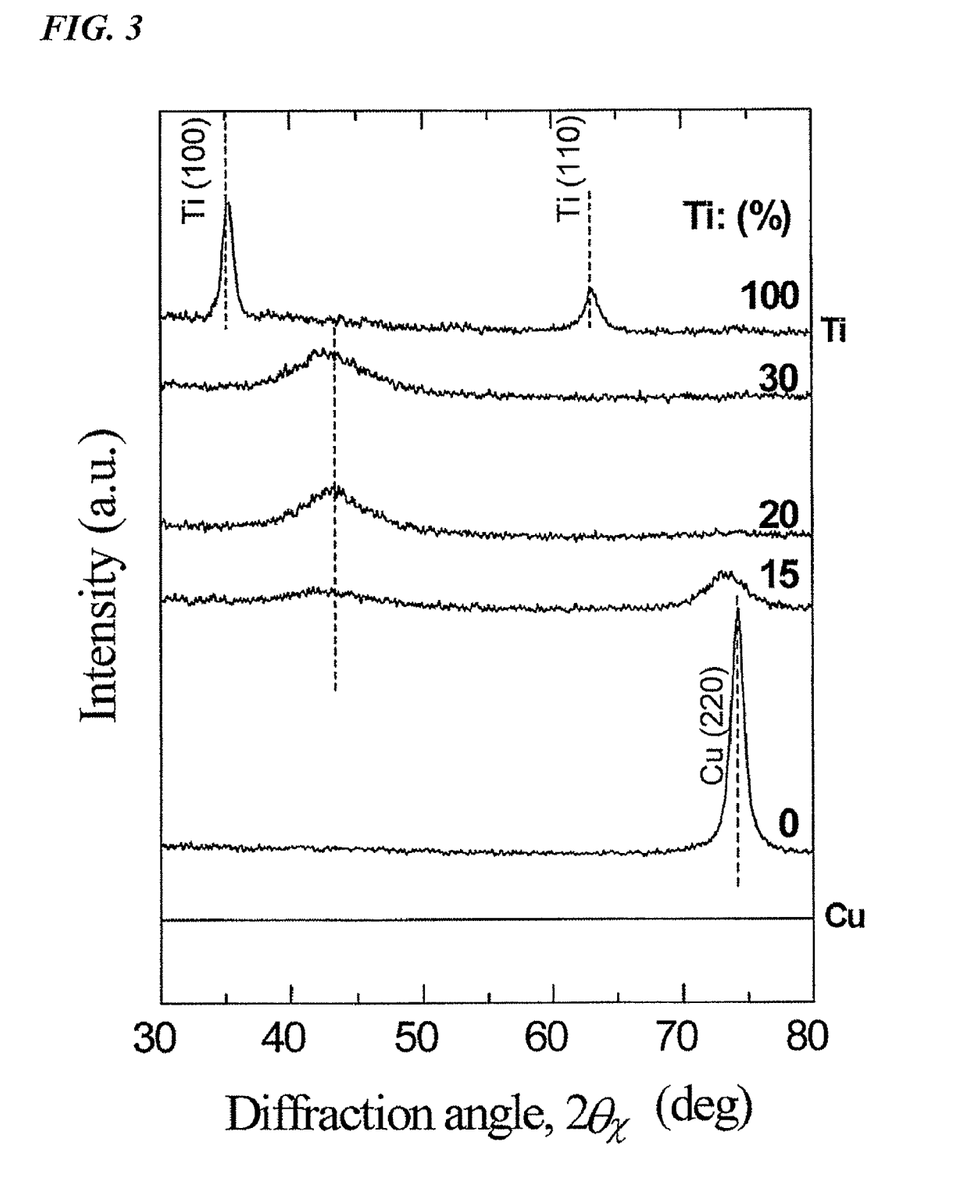
FIG. 3 is a diagram illustrating the in-plane X-ray diffraction profiles of Ti, Cu, and a Ti—Cu alloy.

FIG. 2 is a diagram illustrating the Cu—Ti alloy in a bulk state, and FIG. 3 is a diagram illustrating the In-plane X-ray diffraction profiles of Ti, Cu, and a Ti—Cu alloy.

First, when the content of Ti in the Cu—Ti alloy is in the range of 5 to 15 at % (the content of Cu is in the range of 85 to 95 at %), in the bulk state, an eutectic phase of a Cu phase and a $\beta TiCu_4$ phase forming a face-centered cubic structure is obtained (see FIG. 2).

Next, as can be seen from FIG. 3, the profile of Ti (Ti: 100 at %) has two diffraction peaks. Here, Ti has a hexagonal close-packed (hcp) structure that has a (002) crystal plane orientation with respect to the surface of the substrate, and it is considered that a high-angle peak in the profile is caused by an hcp (110) crystal plane and a low-angle peak is caused by an hcp (100) crystal plane.

Meanwhile, Cu (Ti: 0%) has a face-centered cubic (fcc) structure. In the profile of Cu, only a peak caused by an fcc (220) crystal plane is observed.

Next, as can be seen from the profile of the Cu—Ti alloy, in the profile when the content of Cu is 15 at %, two peaks are observed, similar to the profile of Ti. Of the two peaks, a high-angle peak is caused by the fcc (220) crystal plane. It is considered that the peaks cause the fcc (111) crystal plane of the crystal to be oriented substantially perpendicular to the surface of the substrate.

When the profile of the Cu—Ti alloy (Cu: 15 at %) corresponds to the profile (the profile of Ti) of the hexagonal close-packed (hcp) structure, a peak (high-angle peak) caused by the fcc (220) crystal plane is considered as a peak caused by the hcp (110) plane, and a low-angle peak is considered as a peak caused by the hcp (100) plane, it is considered that the Cu—Ti alloy has a hcp (002) crystal plane orientation in a substantially perpendicular direction to the surface of the substrate.

In the specification, as a result of the observation of the X-ray diffraction profile of a crystal, when two peaks, that is, a peak that is disposed at a position different from that of the peak of the profile of the hexagonal close-packed (hcp) structure and corresponds to the peak caused by the hcp (110) plane and a peak corresponding to the peak caused by the hcp (100) plane, are observed, the crystal has a 'pseudo-hexagonal structure'.

In the profile when the content of Ti is 20 at % and 30 at %, a peak caused by the fcc (220) crystal plane is removed, and only a low-angle peak appears.

As can be seen from the above description, the Cu—Ti alloy including 15 at % of Ti has an fcc (111) crystal plane orientation in a substantially perpendicular direction to the surface of the substrate and has a pseudo-hexagonal structure in layers, regardless of the composition of an alloy having a hexagonal structure in a bulk state. That is, the Cu—Ti alloy satisfies the conditions of the seed layer.

In the diagram showing the bulk state, it is considered that a material having the same alloy composition as the Cu—Ti alloy, that is, the Cu—Ti alloy including 5 to 15 at % of Ti has the same crystal structure as that including 15 at % of Ti.

In this way, when the Cu—Ti alloy includes 5 to 15 at % of Ti, it is possible to easily obtain a predetermined crystal structure, and the Cu—Ti alloy is suitable as a material forming the seed layer 6.

The thickness of the seed layer 6 is preferably equal to or greater than 3 nm and equal to or less than 10 nm, and more preferably, equal to or greater than 3 nm and equal to or less than 6 nm. If the thickness of the seed layer is greater than the above-mentioned range, the distance between the head and the soft magnetic underlayer 2 is excessively large when information is recorded on the magnetic recording medium 10. As a result, a sufficient signal writing performance may not be obtained. If the thickness of the seed layer is less than the above-mentioned range, it is difficult for the Cu—Ti alloy to maintain the pseudo-hexagonal structure, and the Cu—Ti alloy has a random structure or the fcc structure. Therefore, the (111) crystal orientation of the seed layer 6 deteriorates, which may cause the deterioration of the crystal orientation of the magnetic recording layer 4. Therefore, when the thickness of the seed layer 6 is set in the above-mentioned range, it is possible to reliably obtain the seed layer 6 having a pseudo-hexagonal crystal structure. As a result, it is possible to easily orient the layers provided on the seed layer 6, for example, the Ru intermediate layer 7 having the hexagonal close-packed (hcp) structure or the Co alloy magnetic recording layer 4 and obtain fine crystal particles with a uniform diameter in each of the layers.

The intermediate layer 7 has a function of controlling the crystal orientation of the magnetic recording layer 4 formed thereon.

The crystal orientation of the magnetic recording layer 4 formed on the intermediate layer 7 is mainly determined by the crystal orientation of the intermediate layer 7. Therefore, the orientation control of the intermediate layer 7 is an important factor to improve the characteristics of the perpendicular magnetic recording medium.

It is preferable that the intermediate layer 7 have a multi-layer structure. In this case, it is possible to optimize the composition, crystal structure, and formation conditions of the intermediate layer 7 using the seed layer 6 and the magnetic recording layer 4. Therefore, it is possible to obtain the intermediate layer 7 whose orientation can be easily controlled.

In this embodiment, the intermediate layer 7 has a two-layer structure of a first intermediate layer 8 arranged close to the seed layer and a second intermediate layer 9 arranged close to the magnetic recording layer. In this case, it is preferable to set a material forming each layer of the intermediate layer 7 and the formation conditions thereof, considering the following points.

First, it is preferable that the pressure of gas introduced in a film forming atmosphere be low in the initial growth stage of the intermediate layer 7 in order to improve the crystal orientation of the intermediate layer 7. However, when a film is continuously grown at a low gas pressure, crystal particles combine with each other during the growth of the film. In this case, one crystal of the magnetic recording layer 4 is epitaxially grown on one crystal of the intermediate layer 7. Therefore, when the crystal particles combine with each other in the intermediate layer 7, the diameter of the crystal particles of the magnetic recording layer 4 grown on the intermediate layer is increased up to about the diameter of the combined crystal particle of the intermediate layer 7.

For this reason, it is preferable that, in the intermediate layer 7 having a two-layer structure, the first intermediate layer 8 be formed at a low gas pressure, for example, 1 Pa or less, in a film forming atmosphere, in order to improve the crystal orientation of the intermediate layer 8.

In addition, in order to improve the crystal orientation and prevent the combination of the crystal particles, the thickness of the first intermediate layer 8 is preferably equal to or greater than 1 nm and equal to or less than 15 nm, and more preferably, equal to or greater than 5 nm and equal to or less than 10 nm.

The first intermediate layer 8 may be made of a material having the hexagonal close-packed (hcp) structure, specifically, Ru, Re, or alloys including the metal materials. In addition, the first intermediate layer may be made of a material having the following crystal structures (1) and (2):

(1) a crystal structure that includes at least one kind of element selected from an element group having the face-centered cubic structure as the main component, includes an alloy having at least one kind of element selected from an element group having a body-centered cubic structure as the main component, and has both the face-centered cubic structure in which the (111) crystal plane is oriented substantially perpendicular to the surface of a non-magnetic substrate and an irregular layer lattice (stacking fault) caused by a mixture of the face-centered cubic structure and the body-centered cubic structure; and (2) a crystal structure that includes at least one kind of element selected from an element group having the face-centered cubic structure as the main component, includes an alloy having at least one kind of element selected from an element group having the hexagonal close-packed structure as the main component, and has both the face-centered cubic structure in which the (111) crystal plane is oriented substantially perpendicular to the surface of a non-magnetic substrate and an irregular layer lattice (stacking fault) caused by a mixture of the face-centered cubic structure and the hexagonal close-packed structure.

An alloy material having the crystal structure also has good orientation, and forms fine crystal particles.

It is preferable that the pressure of gas introduced into the film forming atmosphere to form the second intermediate layer 9 be, for example, equal to or greater than 1.5 Pa, which is higher than that forming the first intermediate layer 8. In this case, a gap occurs between the crystal particles during the formation of the layer. Therefore, it is possible to prevent the combination of the crystal particles.

It is preferable that the second intermediate layer 9 be made of a material having the hexagonal close-packed (hcp) structure or the face-centered cubic (fcc) structure in order to epitaxially grow the magnetic recording layer 4 thereon. In addition, the second intermediate layer 9 may have a so-called granular structure in which the grain boundary of an oxide or a nitride surrounds each crystal particle. In this case, it is possible to prevent the combination of the crystal particles and obtain fine crystal particles due to the large width of the grain boundary. As described above, since one crystal particle of the magnetic recording layer 4 is epitaxially grown on one crystal particle of the intermediate layer 7, the size of the crystal particle of the intermediate layer 7 is reduced. Therefore, it is possible to reduce the size of the crystal particles of the magnetic recording layer 4.

Next, the magnetic recording layer 4 will be described.

Information is recorded on the magnetic recording layer 4 as magnetic signals by magnetic inversion.

In the perpendicular magnetic recording medium, in many cases, the crystal structure of the magnetic recording layer 4 is the hcp structure. It is important that a (002) crystal plane is parallel to the surface of the substrate, that is, a crystal c-axis ([002] axis) is aligned with the perpendicular direction with the least possible disorder.

The half-width of a rocking curve may be used as an index for the degree of orientation of the crystal c-axis ([002] axis). The half-width of the rocking curve may be calculated as follows.

First, a substrate having a film formed thereon is placed on an X-ray diffractometer, and a crystal plane that is parallel to the surface of the substrate is analyzed by the X-ray diffractometer. When a sample includes a film having the hexagonal close-packed structure, such as the intermediate layer or the magnetic recording layer, a diffraction peak corresponding to the crystal plane thereof is observed. For example, when the perpendicular magnetic recording medium is made of a Co-based alloy, the c-axis ([002] axis) direction of the hexagonal close-packed structure is aligned substantially perpendicular to the surface of the substrate. Therefore, a peak corresponding to the hcp (002) crystal plane is observed. Then, an optical system is swung relative to the surface of the substrate while maintaining the Bragg angle with respect to the hcp (002) crystal plane. In this case, when the diffraction intensity of the hcp (002) crystal plane with respect to the inclination angle of the optical system is plotted, it is possible to draw one peak, which is called a rocking curve.

In this case, when the hcp (002) crystal plane is substantially parallel to the surface of the substrate, a sharp rocking curve is obtained. On the other hand, when the direction of the hcp (002) crystal plane is widely spread, a broad rocking curve is obtained. Therefore, the half-width $\Delta\theta$ 50 of the rocking curve can be used as an index for the degree of orientation of the crystal c-axis ([002] axis) of the perpendicular magnetic recording medium. That is, when the half-width Δθ 50 is relatively small, it can be determined that the crystal c-axis ([002] axis) is oriented substantially perpendicular to the surface of the substrate. When the half-width Δθ 50 is relatively large, it can be determined that the degree of orientation of the crystal c-axis ([002] axis) is low.

Therefore, according to the present invention, it is possible to easily obtain a perpendicular magnetic recording layer having a small half-width Δθ50 by defining the composition and crystal structure of the seed layer 6.

For example, the magnetic recording layer 4 is made of a Co-based alloy, such as CoCr, CoCrPt, CoCrPtB, CoCrPtB—X, CoCrPtB—X—Y, CoCrPt—O, CoCrPt—$SiO_2$, CoCrPt—$Cr_2O_3$, CoCrPt—$TiO_2$, CoCrPt—$ZrO_2$, CoCrPt—$Nb_2O_5$, CoCrPt—$Ta_2O_5$, CoCrPt—$B_2O_3$, CoCrPt—$WO_2$, or CoCrPt—$WO_3$. Among them, in particular, when a magnetic oxide layer is used, it is preferable that the layer have a granular structure in which an oxide surrounds magnetic Co crystal particles. In this case, magnetic interaction between the Co crystal particles is weakened. Finally, the crystal structure and the magnetic characteristics of the magnetic recording layer determine read/write characteristics of the magnetic recording medium 10. As a result, the noise of the magnetic recording layer 4 is reduced, and the magnetic recording medium 10 has good read/write characteristics.

It is preferable that the average diameter of the magnetic crystal particles in the magnetic recording layer be equal to or less than 7.5 nm. In this case, the recording bit transition boundary line becomes a smooth straight line, and good characteristics can be obtained in a high recording density region.

The protective layer 5 has a function of protecting the recording medium from the damage caused by contact between the head and the recording medium.

For example, a carbon film or a $SiO_2$ film is used as the protective layer 5. It is preferable to use the carbon film since it has a high protection performance. For example, a sputtering method or a plasma CVD method is used to form the protective layer. In recent years, the plasma CVD method has generally been used. However, a magnetron plasma CVD method may also be used to form the protective layer.

The thickness of the protective layer 5 is preferably in the range of about 1 nm to 10 nm, more preferably, about 2 to 6 nm, and most preferably, 2 to 4 nm.

Since the magnetic recording medium has good characteristics in a high-density recording region, the present invention can also be applied to new perpendicular recording media that are expected to improve recording density in the near future, such as ECC media, discrete track media, and pattern media.

Next, a method of manufacturing the magnetic recording medium according to the present invention shown in FIG. 1 will be described.

First, the non-magnetic substrate 1 is prepared, cleaned, and dried.

Since the non-magnetic substrate 1 is cleaned and dried, it is possible to form layers on the non-magnetic substrate 1 with high adhesion therebetween. As the cleaning method, a water cleaning method or a cleaning method using etching (Bias sputtering) may be used.

Then, the soft magnetic underlayer 2, the seed layer 6, the first intermediate layer 8, the second intermediate layer 9, and the magnetic recording layer 4 are sequentially formed on the non-magnetic substrate 1.

As the method of forming the layers, for example, a sputtering method using a target corresponding to a material forming each layer is used. In general, a DC magnetron sputtering method or an RF sputtering method is used as the sputtering method. In addition, voltage applying methods, for example, sputtering methods using an RF bias, a DC bias, a pulsed DC, and a pulsed DC bias may be used. As a sputtering gas, Kr gas, $O_2$ gas, $H_2O$ gas, $H_2$ gas, and $N_2$ gas may be used.

In this case, the pressure of the sputtering gas is appropriately determined such that each layer has optimal characteristics. In general, the pressure of the sputtering gas is in the range of about 0.1 to 30 Pa. In particular, it is preferable that the first intermediate layer 8 be formed at a gas pressure of 1 Pa or less and the second intermediate layer 9 be formed at a gas pressure of 1.5 Pa or more, as described above. In this case, it is possible to form the intermediate layer 7 whose orientation can be easily controlled.

The, the protective layer 5 is formed on the magnetic recording layer 4.

The protective layer 5 may be formed by, for example, a sputtering method, a plasma CVD method, or a magnetron plasma CVD method. In this way, the magnetic recording medium 10 shown in FIG. 1 is obtained.

Next, a magnetic recording/reproducing apparatus according to another embodiment of the present invention will be described.

Figure 4:
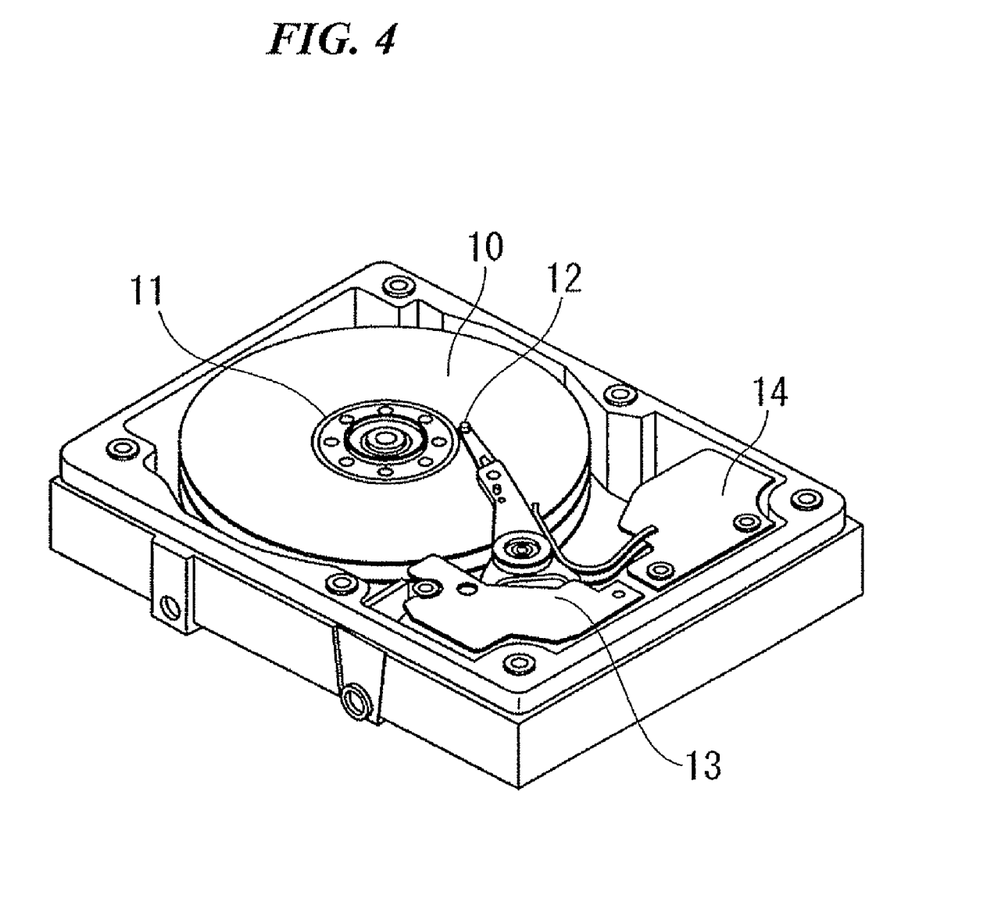
FIG. 4 is a diagram schematically illustrating an example of the structure of a magnetic recording/reproducing apparatus according to the present invention.

FIG. 4 is a diagram schematically illustrating an example of the structure of the magnetic recording/reproducing apparatus according to the embodiment of the present invention.

The magnetic recording/reproducing apparatus shown in FIG. 4 includes the magnetic recording medium 10 having the structure shown in FIG. 1, a medium driving unit 11 that rotates the magnetic recording medium 10, a magnetic head 12 that records or reproduces information on or from the magnetic recording medium 10, a head driving unit 13 that moves the magnetic head 12 relative to the magnetic recording medium 10, and a recording/reproducing signal processing system 14.

The recording/reproducing signal processing system 14 can process data input from the outside and transmit recording signals to the magnetic head 12. In addition, the recording/reproducing signal processing system 14 can process reproduction signals from the magnetic head 12 to generate data, and transmit the data to the outside.

As the magnetic head 12 used for the magnetic recording/reproducing apparatus according to the present invention, the following may be used: a magnetic head that includes, as a reproducing element, an AMR (anisotropic magneto-resistance) element using an AMR effect, a GMR (giant magneto-resistance) element using a GMR effect, or a TuMR (tunnel magneto-resistance) element using a tunnel magneto-resistance effect, and is applicable to improve recording density.

In the magnetic recording/reproducing apparatus having the above-mentioned structure, the magnetic recording layer of the magnetic recording medium is oriented in a substantially perpendicular direction, and the diameters of the magnetic particles of the magnetic recording layer are uniform and very small. Therefore, it is possible to obtain good read/write characteristics in a high-density recording region. In addition, it is possible to set the thickness of the seed layer of the magnetic recording medium to a relatively small value. As a result, it is possible to effectively apply the recording magnetic field from the recording head to the magnetic recording layer and reliably write information.

Although the magnetic recording medium, the method of manufacturing the same, and the magnetic recording/reproducing apparatus according to the present invention have been described above, the structure of the present invention is not limited thereto.

For example, in this embodiment, the seed layer and the magnetic recording layer each have a single layer structure, but they may have a multi-layer structure. In addition, the structure of the intermediate layer is not limited to a two-layer structure, but the intermediate layer may have a single layer structure or a multi-layer structure of three or more layers.

EXAMPLES

Next, the present invention will be described in detail with reference to examples.

Example 1-1

First, an HD glass substrate was set in a vacuum chamber of a sputtering apparatus, and the vacuum chamber was evacuated to a pressure of $1.0 \times 10^{-5}$ Pa or less.

Then, a soft magnetic underlayer (thickness: 50 nm) made of Co-10Ta-5Zr was formed on the glass substrate in an Ar atmosphere by a sputtering method. In this case, the pressure of Ar gas was 0.6 Pa. (In the composition formula of each alloy, a number given to the front side of each element indicates the content (at %) of each element in the alloy, and the content of an element given no number is the remaining content of the other element).

Then, a seed layer (thickness: about 5 nm) made of Cu-7Ti was formed on the soft magnetic underlayer in an Ar atmosphere by the sputtering method. In this case, the pressure of Ar gas was 0.6 Pa.

The profile of the seed layer was observed by In-plane X-ray diffraction. As a result, a peak caused by the fcc (220) crystal plane and another peak on the low-angle side of the peak were observed. This proved that the seed layer had an fcc (111) crystal orientation in a substantially perpendicular direction to the surface of the substrate and had a pseudo-hexagonal structure.

Then, a first intermediate layer (thickness: 5 nm) made of Ru was formed on the seed layer in an Ar atmosphere by the sputtering method. In this case, the pressure of Ar gas was 0.6 Pa.

Then, a second intermediate layer (thickness: 15 nm) made of Ru was formed on the first intermediate layer in an Ar atmosphere by the sputtering method. In this case, the pressure of Ar gas was 5 Pa.

Then, a magnetic recording layer (thickness: 14 nm) made of 90(Co-12Cr-18Pt)-10($SiO_2$) (a number given to the front side of the composition formula of each composite indicates the content (mol %) of each composite) was formed on the second intermediate layer in an Ar atmosphere by the sputtering method. In this case, the pressure of Ar gas was 5 Pa.

Then, a carbon film (thickness: 4 nm) was formed as a protective layer on the magnetic recording layer by a CVD method, and a lubricant was coated on the carbon film to manufacture a perpendicular magnetic recording medium.

Examples 1-2 and 1-3

A perpendicular magnetic recording medium was manufactured by the same method as that in Example 1-1 except that the composition of the seed layer was changed as shown in Table 1.

The profile of the seed layer formed in each magnetic recording medium was observed by In-plane X-ray diffraction. As a result, a peak caused by the fcc (220) crystal plane and another peak arranged on the low-angle side of the peak were observed. The observation result proved that each seed layer had the pseudo-hexagonal structure in which the fcc (111) crystal plane was oriented substantially perpendicular to the surface of the substrate.

Comparative Examples 1-1 to 1-4

A perpendicular magnetic recording medium was manufactured by the same method as that in Example 1-1 except that the composition of the seed layer was changed as shown in Table 1.

The read/write characteristics and static magnetic characteristics of the magnetic recording media according to Examples (Examples 1-1 to 1-3) and Comparative examples (Comparative examples 1-1 to 1-4) and the crystal orientation and crystal particle diameters of the magnetic recording layers were evaluated as follows.

"Read/Write Characteristics"

The read/write characteristics of each of the magnetic recording media were evaluated by measuring the SNR of the magnetic recording media using Read/Write Analyzer 1632 and Spin Stand S1701MP available from Guzik Technical Enterprises of the USA.

"Magnetic Characteristics"

The magnetic characteristics of each of the magnetic recording media were evaluated by measuring the coercivity Hc of the magnetic recording media using a Kerr measuring apparatus.

"Crystal Orientation"

The rocking curve of each of the magnetic recording layers was observed by an X-ray diffractormeter, and the half-width Δθ 50 was measured. In this way, the crystal orientation of each of the magnetic recording layers was evaluated.

"Crystal Particle Diameters"

Each of the magnetic recording layers was observed by a transmission electron microscope (TEM), and particle diameter analysis was performed on the in-plane images of the observed magnetic recording layers, thereby evaluating the crystal particle diameters of the magnetic recording layers. The evaluation results are shown in Table 1.

TABLE 1

| Sample | Seed layer (at %) | Structure of seed layer | Thickness (nm) | SNR (dB) | Hc (Oe) | Δθ 50 (deg.) | Average diameter of crystal particles (nm) |
|---|---|---|---|---|---|---|---|
| Example 1-1 | Cu5Ti | Pseudo-hexagonal structure | 5 | 17.1 | 3981 | 3.3 | 6.7 |
| Example 1-2 | Cu10Ti | Pseudo-hexagonal structure | 5 | 17.3 | 3892 | 3.4 | 6.4 |
| Example 1-3 | Cu15Ti | Pseudo-hexagonal structure | 5 | 17.5 | 3779 | 3.3 | 6.5 |
| Comparative example 1-1 | Cu | Face-centered cubic structure | 5 | 16.2 | 4529 | 4.2 | 9.6 |
| Comparative example 1-2 | Cu20Ti | Hexagonal close-packed lattice | 5 | 15.3 | 3634 | 5.4 | 8.5 |
| Comparative example 1-3 | Cu50Ti | Hexagonal close-packed lattice | 5 | 13.6 | 3256 | 8.2 | 8.2 |
| Comparative example 1-4 | Ti | Hexagonal close-packed lattice | 5 | 15.2 | 3891 | 5.8 | 8.5 |

Table 1 shows that, in the magnetic recording medium manufactured in each example, the magnetic recording layer has a high degree of crystal orientation (Δθ 50 is small), the average diameter of the crystal magnetic particles in the magnetic recording layer is small, and the magnetic recording layer has a high SNR, as compared to the magnetic recording medium manufactured in each comparative example. In addition, the coercivity Hc of the magnetic recording medium manufactured in each example tends to be relatively small. This is because the diameters of the crystal particles in the magnetic recording layer are very small and the magnetic recording layer is likely to be affected by thermal fluctuation. In addition, the coercivity Hc of the magnetic recording medium manufactured in comparative example 1-3 is relatively small. This is because the orientation of the magnetic recording layer is low.

Example 2-1

Similar to Example 1-1, a soft magnetic underlayer was formed on a glass substrate.

Then, a seed layer (thickness: about 4 nm) made of Cu-7Ti was formed on the soft magnetic underlayer in an Ar atmosphere by the sputtering method. In this case, the pressure of Ar gas was 0.6 Pa.

Then, a first intermediate layer (thickness: 8 nm) made of Ru was formed on the seed layer in an Ar atmosphere by the sputtering method. In this case, the pressure of Ar gas was 0.6 Pa.

Then, a second intermediate layer (thickness: 8 nm) made of Ru was formed on the first intermediate layer in an Ar atmosphere by the sputtering method. In this case, the pressure of Ar gas was 10 Pa.

Then, a magnetic recording layer (thickness: 12 nm) made of 90(Co-12Cr-20Pt)-10($SiO_2$) (a number given to the front side of the composition formula of each composite indicates the content (mol %) of each composite) was formed on the second intermediate layer in an Ar atmosphere by the sputtering method. In this case, the pressure of Ar gas was 10 Pa.

Then, a carbon film (thickness: 4 nm) was formed as a protective layer on the magnetic recording layer by a CVD method, and a lubricant was coated on the carbon film.

Examples 2-2 to 2-9

A perpendicular magnetic recording medium was manufactured by the same method as that in Example 2-1 except that the composition and thickness of the seed layer were changed as shown in Table 2.

Comparative Examples 2-1 to 2-12

A perpendicular magnetic recording medium was manufactured by the same method as that in Example 2-1 except that the composition and thickness of the seed layer were changed as shown in Table 2.

In the comparative examples, among the materials used to form the seed layers, Ni, Cu, and Pt each have the face-centered cubic (fcc) structure, and Ti has the hexagonal close-packed (hcp) structure.

The read/write characteristics and static magnetic characteristics of the magnetic recording media obtained in the examples and the comparative examples and the crystal orientation and crystal particle diameters of the magnetic recording layers were evaluated by the same method as described above.

The evaluation results are shown in Table 2

TABLE 2

| Sample | Seed layer (at %) | Structure of seed layer | Thickness (nm) | SNR (dB) | Hc (Oe) | Δθ 50 (deg.) | Average diameter of crystal particles (nm) |
|---|---|---|---|---|---|---|---|
| Example 2-1 | Cu5Ti | Pseudo-hexagonal structure | 4 | 18.3 | 4032 | 2.9 | 6.3 |
| Example 2-2 | Cu5Ti | Pseudo-hexagonal structure | 6 | 18.4 | 4182 | 2.9 | 6.7 |

TABLE 2-continued

| Sample | Seed layer (at %) | Structure of seed layer | Thickness (nm) | SNR (dB) | Hc (Oe) | Δθ 50 (deg.) | Average diameter of crystal particles (nm) |
|---|---|---|---|---|---|---|---|
| Example 2-3 | Cu5Ti | Pseudo-hexagonal structure | 8 | 18.4 | 4199 | 2.7 | 6.7 |
| Example 2-4 | Cu10Ti | Pseudo-hexagonal structure | 4 | 18.2 | 3875 | 2.8 | 6.0 |
| Example 2-5 | Cu10Ti | Pseudo-hexagonal structure | 6 | 18.1 | 4055 | 2.8 | 6.4 |
| Example 2-6 | Cu10Ti | Pseudo-hexagonal structure | 8 | 18.4 | 4172 | 2.7 | 6.6 |
| Example 2-7 | Cu15Ti | Pseudo-hexagonal structure | 4 | 18.2 | 3824 | 3.2 | 5.9 |
| Example 2-8 | Cu15Ti | Pseudo-hexagonal structure | 6 | 18.0 | 3878 | 3.4 | 5.9 |
| Example 2-9 | Cu15Ti | Pseudo-hexagonal structure | 8 | 18.0 | 4004 | 3.1 | 6.1 |
| Comparative example 2-1 | Ni | Face-centered cubic structure | 4 | 16.6 | 4723 | 4.0 | 9.4 |
| Comparative example 2-2 | Ni | Face-centered cubic structure | 6 | 16.2 | 4882 | 3.7 | 9.8 |
| Comparative example 2-3 | Ni | Face-centered cubic structure | 8 | 14.6 | 5034 | 3.5 | 10.1 |
| Comparative example 2-4 | Cu | Face-centered cubic structure | 4 | 16.2 | 4425 | 4.6 | 9.8 |
| Comparative example 2-5 | Cu | Face-centered cubic structure | 6 | 16.0 | 4561 | 4.2 | 10.1 |
| Comparative example 2-6 | Cu | Face-centered cubic structure | 8 | 15.2 | 4802 | 4.1 | 10.6 |
| Comparative example 2-7 | Pt | Face-centered cubic structure | 4 | 15.7 | 4333 | 4.0 | 9.3 |
| Comparative example 2-8 | Pt | Face-centered cubic structure | 6 | 15.5 | 4503 | 3.9 | 9.5 |
| Comparative example 2-9 | Pt | Face-centered cubic structure | 8 | 15.0 | 4728 | 3.6 | 9.6 |
| Comparative example 2-10 | Ti | Hexagonal close-packed lattice | 4 | 15.2 | 3598 | 5.9 | 8.1 |
| Comparative example 2-11 | Ti | Hexagonal close-packed lattice | 6 | 15.8 | 3683 | 5.8 | 8.4 |
| Comparative example 2-12 | Ti | Hexagonal close-packed lattice | 8 | 16.0 | 4231 | 5.2 | 8.4 |
| Comparative example 2-13 | Cu15Ti | Random | 1 | 8.1 | 2634 | 5.9 | 6.4 |
| Comparative example 2-14 | Cu15Ti | Random | 2 | 8.4 | 2493 | 6.4 | 6.2 |

Table 2 shows that, in the magnetic recording media manufactured in the examples in which the seed layers have the same composition but have different thicknesses, even when the thickness of the seed layer is increased, there is little variation in the diameter of the crystal particles of the magnetic recording layer. In addition, even when the seed layer has a small thickness of about 4 nm, it is possible to improve the crystal orientation of the magnetic recording layer and reduce the diameter of the crystal particles in the magnetic recording layer.

In contrast, among the magnetic recording media manufactured in the comparative examples, in the magnetic recording medium including the seed layer having the fcc structure (Comparative examples 2-1 to 2-9), when the thickness of the seed layer is increased, the crystal orientation of the magnetic recording layer is improved, but the diameter of the crystal particles is increased. Therefore, the SNR is lowered.

In addition, among the magnetic recording media manufactured in the comparative examples, in the magnetic recording medium including the seed layer having the hcp structure (Comparative examples 2-10 to 2-12), when the thickness of the seed layer is increased, the crystal orientation of the magnetic recording layer is improved, but the degree of improvement is less than that in each of the examples. In addition, the diameter of the crystal particles in the magnetic recording layer is large.

In Comparative examples 2-13 and 2-14, the diameter of the crystal particles is small, similar to the examples. However, the crystal orientation of Ru is very low, and the coercivity and the SNR are low. The reason is as follows. When the thickness of the seed layer is equal to or greater than about 4 nm as in the examples, Cu15Ti can form the pseudo-hexagonal structure. However, when the seed layer has a small thickness of about 1 nm, Cu15Ti does not have the fcc (111) crystal orientation, but has random orientation. Therefore, it is difficult for Cu15Ti to form the pseudo-hexagonal structure.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A magnetic recording medium comprising:
at least an underlayer, an orientation control layer, a magnetic recording layer, and a protective layer formed on a non-magnetic substrate,
wherein the orientation control layer has a multi-layer structure including at least a seed layer and an intermediate layer,
the seed layer is arranged closer to the non-magnetic substrate than the intermediate layer,
the seed layer includes an alloy layer that is made of a Cu—Ti alloy, which is a main material, having Cu as a main component, and in the Cu—Ti alloy, the content of Cu is in the range of 85 at % to 95 at %, and the content of Ti is in the range of 5 at % to 15 at %,
the Cu—Ti alloy has a (111) crystal plane oriented substantially perpendicular to the surface of the non-magnetic substrate and has a pseudo-hexagonal structure,
a film thickness of the seed layer is equal to or greater than 3 nm and equal to or less than 10 nm,
the seed layer is formed directly on the soft magnetic underlayer, and
the soft magnetic underlayer has a soft magnetic amorphous structure.

2. The magnetic recording medium according to claim 1, wherein the intermediate layer includes a metal layer that is made of Ru, Re, or any one of alloy materials thereof, which is a main material, and has a hexagonal close-packed structure.

3. The magnetic recording medium according to claim 1, wherein the intermediate layer has at least one element selected from elements having a face-centered cubic structure as a main component, an alloy containing an element having a body-centered cubic structure, a face-centered cubic structure performing (111) crystal plane orientation approximately perpendicularly to the surface of the non-magnetic substrate, and an irregular layer lattice being in layers and a body-centered cubic structure therein.

4. The magnetic recording medium according to claim 1, wherein the intermediate layer has at least one element selected from elements having a face-centered cubic structure as a main component, an alloy containing an element having a hexagonal close-packed structure, a face-centered cubic structure performing (111) crystal plane orientation approximately perpendicularly to the surface of the non-magnetic substrate, and an irregular layer lattice being in layers and a hexagonal close-packed structure therein.

5. The magnetic recording medium according to claim 1, wherein the magnetic recording layer includes a magnetic layer that has a granular structure formed by ferromagnetic crystal particles and a grain boundary made of a non-magnetic oxide, and
the average diameter of the ferromagnetic crystal particles in the magnetic layer is equal to or less than 7.5 nm in particle diameter analysis using a transmission electron microscope.

6. A magnetic recording/reproducing apparatus comprising:
the magnetic recording medium according to claim 1; and
a magnetic head that records or reproduces information on or from the magnetic recording medium.

* * * * *